United States Patent
Jung et al.

(10) Patent No.: US 7,175,282 B2
(45) Date of Patent: Feb. 13, 2007

(54) PROJECTION APPARATUS HAVING SEPARATED OPTICAL ENGINE AND DRIVING CIRCUIT

(75) Inventors: Young-jun Jung, Suwon-si (KR); Woo-young Kan, Hwasung-gun (KR); Sang-hak Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 296 days.

(21) Appl. No.: 10/902,933

(22) Filed: Aug. 2, 2004

(65) Prior Publication Data

US 2005/0248731 A1    Nov. 10, 2005

(30) Foreign Application Priority Data

May 8, 2004    (KR) ............ 10-2004-0032515

(51) Int. Cl.
*G03B 21/22* (2006.01)
*H04N 5/64* (2006.01)

(52) U.S. Cl. ............ 353/47; 353/52; 353/74; 348/789; 348/794

(58) Field of Classification Search ........... 353/52, 353/57, 60, 61, 73, 74, 77, 79, 119, 72, 47; 348/787–789, 794, 836, 839; 359/453, 456, 359/460; G03B 21/22
See application file for complete search history.

(56) References Cited

U.S. PATENT DOCUMENTS

| | | | | |
|---|---|---|---|---|
| 4,358,792 A * | 11/1982 | Domoleczny et al. | ...... | 348/789 |
| 5,278,595 A * | 1/1994 | Nishida et al. | ...... | 353/78 |
| 5,929,945 A * | 7/1999 | Negishi et al. | ...... | 348/825 |
| 6,533,421 B2 | 3/2003 | Ono | | |
| 6,545,729 B1 * | 4/2003 | Lowe | ...... | 348/836 |
| 6,616,283 B1 * | 9/2003 | Takano et al. | ...... | 353/74 |
| 6,661,473 B1 * | 12/2003 | Teshima et al. | ...... | 348/787 |

(Continued)

FOREIGN PATENT DOCUMENTS

JP    9-54372    2/1997

(Continued)

OTHER PUBLICATIONS

Korean Office Action dated Jan. 24, 2006 for KR Appln 2004-32515.

(Continued)

*Primary Examiner*—W. B. Perkey
*Assistant Examiner*—Andrew Sever
(74) *Attorney, Agent, or Firm*—Stanzione & Kim, LLP

(57) ABSTRACT

A projection apparatus includes a screen to display a picture thereon, an upper cabinet to support the screen, an optical engine provided in a lower portion of the upper cabinet to project an image beam toward the screen, a circuit unit to drive the optical engine, a lower cabinet to accommodate the optical engine and the circuit unit, and a partition plate provided in the lower cabinet to partition the lower cabinet into an upper accommodating portion and a lower accommodating portion to allow the lower cabinet to separately accommodate the optical engine and the circuit unit. In the projection apparatus, the optical engine and the driving circuit are separated from each other, thereby improving a cooling efficiency and a working efficiency, and providing a design having various appearances.

54 Claims, 8 Drawing Sheets

U.S. PATENT DOCUMENTS

2002/0036722 A1* 3/2002 Hori .................... 348/787
2005/0248727 A1* 11/2005 Jung et al. .............. 353/57

FOREIGN PATENT DOCUMENTS

| JP | 9-98357 | 4/1997 |
| JP | 10097000 A | 4/1998 |
| JP | 2000-147449 | 5/2000 |
| KR | 20-165119 | 10/1999 |
| KR | 10-426700 | 3/2004 |

OTHER PUBLICATIONS

International Search Report (International application No.: PCT/KR2004/001936) filed on Jul. 31, 2004.

* cited by examiner

PROJECTION APPARATUS HAVING SEPARATED OPTICAL ENGINE AND DRIVING CIRCUIT

CROSS-REFERENCE TO RELATED APPLICATIONS

This application claims the benefit of Korean Patent Application No. 2004-0032515, filed May 8, 2004, in the Korean Intellectual Property Office, the disclosure of which is incorporated herein by reference.

BACKGROUND OF THE INVENTION

1. Field of the Invention

The present invention relates to a projection apparatus, and more particularly, to a projection apparatus, in which an image beam projected through an optical engine reflects from a reflector and travels forward, to display a picture on a screen.

2. Description of the Related Art

FIG. 1 is a schematic view of a conventional projection television 101. As shown in FIG. 1, the conventional projection television 101 includes a cabinet 110 forming an entire outer appearance, a screen 111 provided in a front of the cabinet 110, a reflector 113 placed in an inside rear of the cabinet 110, an optical engine 150 accommodated in a lower portion of the cabinet 110 and projecting an image beam toward the reflector 113, and a driving circuit 160 driving the optical engine 150.

The optical engine 150 includes a light source (not shown) emitting light, a display device (not shown) realizing an image using the light emitted from the light source, and various lenses (not shown).

With this configuration, in the conventional projection television 101, the driving circuit 160 drives the optical engine 150 to form an image beam, and the image beam is projected toward the screen 111 via the reflector 113, thereby displaying a picture. At this time, the optical engine 1 generates relatively much heat in the light source, etc. thereof.

However, in the conventional projection television, the optical engine that generates relatively much heat is placed near to the driving circuit in the lower portion of the cabinet, so that the heat generated in the optical engine is transferred to the driving circuit, thereby causing the driving circuit to malfunction. Accordingly, the optical engine and the driving circuit are required to be separated from each other so as to improve a cooling efficiency.

Further, in the conventional projection television, the cabinet supporting the screen, the optical engine, etc. is formed as a single body, so that a working efficiency, such as assembling efficiency, maintenance efficiency, etc., is relatively low. In particular, the larger the screen is, the lower the working efficiency is. Besides, to replace only the screen with one having a different size, the whole cabinet should be replaced with another one. Also, it is difficult to apply various designs to the cabinet.

Further, in the conventional television, the driving circuit is horizontally disposed in the lower portion of the cabinet, so that free convection is obstructed, thereby deteriorating the cooling efficiency thereof.

SUMMARY OF THE INVENTION

In order to solve the foregoing and/or other problems, it is an aspect of the present general inventive concept to provide a projection apparatus, in which an optical engine and a driving circuit are separated from each other, thereby improving a cooling efficiency.

Another aspect of the present general inventive concept is to provide a projection apparatus, which allows a working efficiency to be improved and can be designed to have various appearances.

Additional aspects and advantages of the present general inventive concept will be set forth in part in the description which follows and, in part, will be obvious from the description, or may be learned by practice of the general inventive concept.

The foregoing and/or other aspects of the present invention may be achieved by providing a projection apparatus including a screen to display a picture thereon, an upper cabinet to support the screen, an optical engine provided in a lower portion of the upper cabinet and to project an image beam toward the screen, a circuit unit to drive the optical engine, a lower cabinet to accommodate the optical engine and the circuit unit, and a partition plate provided in the lower cabinet and to partition the lower cabinet into an upper accommodating portion and a lower accommodating portion to allow the lower cabinet to separately accommodate the optical engine and the circuit unit.

According to an aspect of the present general inventive concept, the partition plate can be formed with a ventilator through which air passes between the lower and upper accommodating portions partitioned by the partition plate.

According to another aspect of the present general inventive concept, wherein the lower cabinet can be formed with an air inlet at a bottom surface thereof to inhale external air.

According to yet another aspect of the present general inventive concept, the lower cabinet formed with the upper accommodating portion can be formed with an air outlet to discharge internal air.

According to still another aspect of the present general inventive concept, the projection apparatus may further include a cooling fan to cool the optical engine and the circuit unit.

According to another aspect of the present general inventive concept, the cooling fan can be connected to the partition plate and can blow the air from the lower accommodating portion to the upper accommodating portion.

According to another aspect of the present general inventive concept, the projection apparatus may further include a supporting plate provided between the upper cabinet and the lower cabinet to support the upper cabinet.

According to another aspect of the present general inventive concept, the supporting plate can be made of an aluminum material and can be detachably connected to the upper cabinet and the lower cabinet.

According to another aspect of the present general inventive concept, the lower cabinet may have a width narrower than that of the upper cabinet, and the lower cabinet may be connected to a bottom center of the supporting plate.

According to another aspect of the present general inventive concept, under the lower cabinet is provided a base including a plurality of spacers to be spaced from a seating place at a predetermined distance.

According to another aspect of the present general inventive concept, the circuit unit can include a supporting frame to support at least one circuit board.

According to another aspect of the present general inventive concept, the supporting frame can include a pair of supporters to support the plurality of circuit boards to vertically stand and to be horizontally spaced from each other.

According to another aspect of the present general inventive concept, to slidably connect the supporting frame with the lower cabinet, either the supporting frame or the lower cabinet can be provided with a guide protrusion, and the other one can be formed with a guide groove to accommodate the guide protrusion.

BRIEF DESCRIPTION OF THE DRAWINGS

The above and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
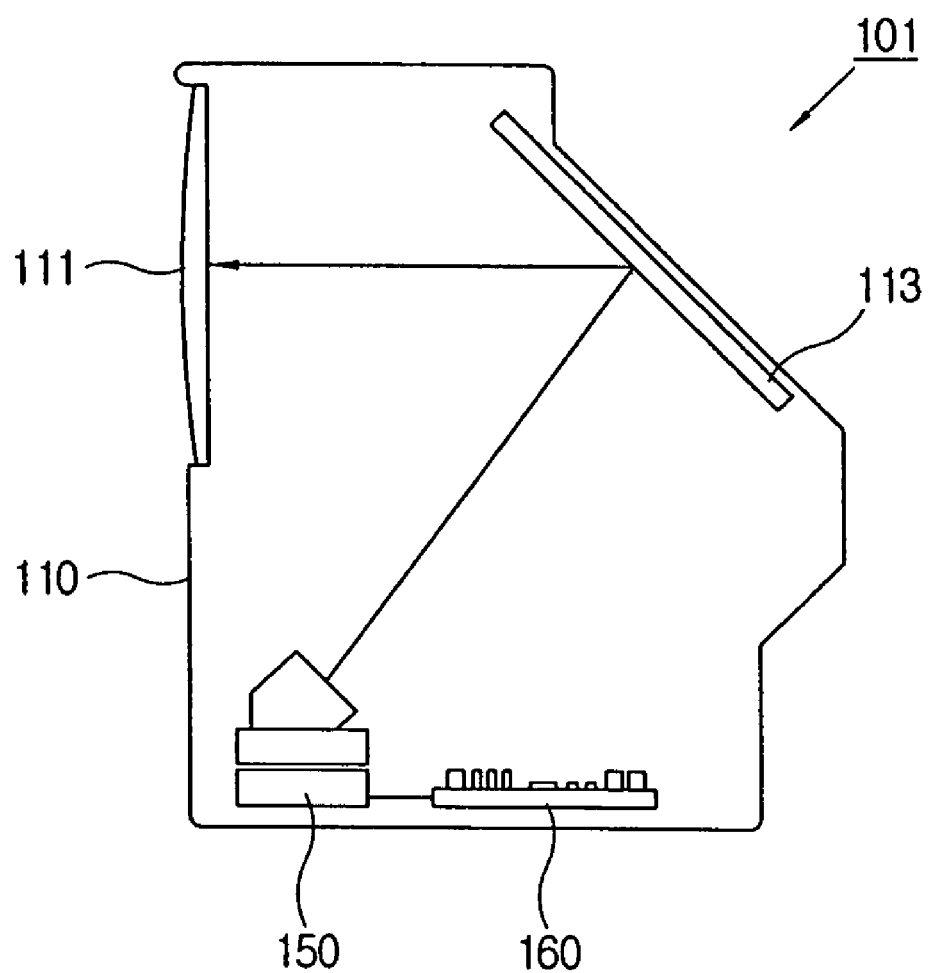
FIG. 1 is a schematic view of a conventional projection television.
Figure 2:
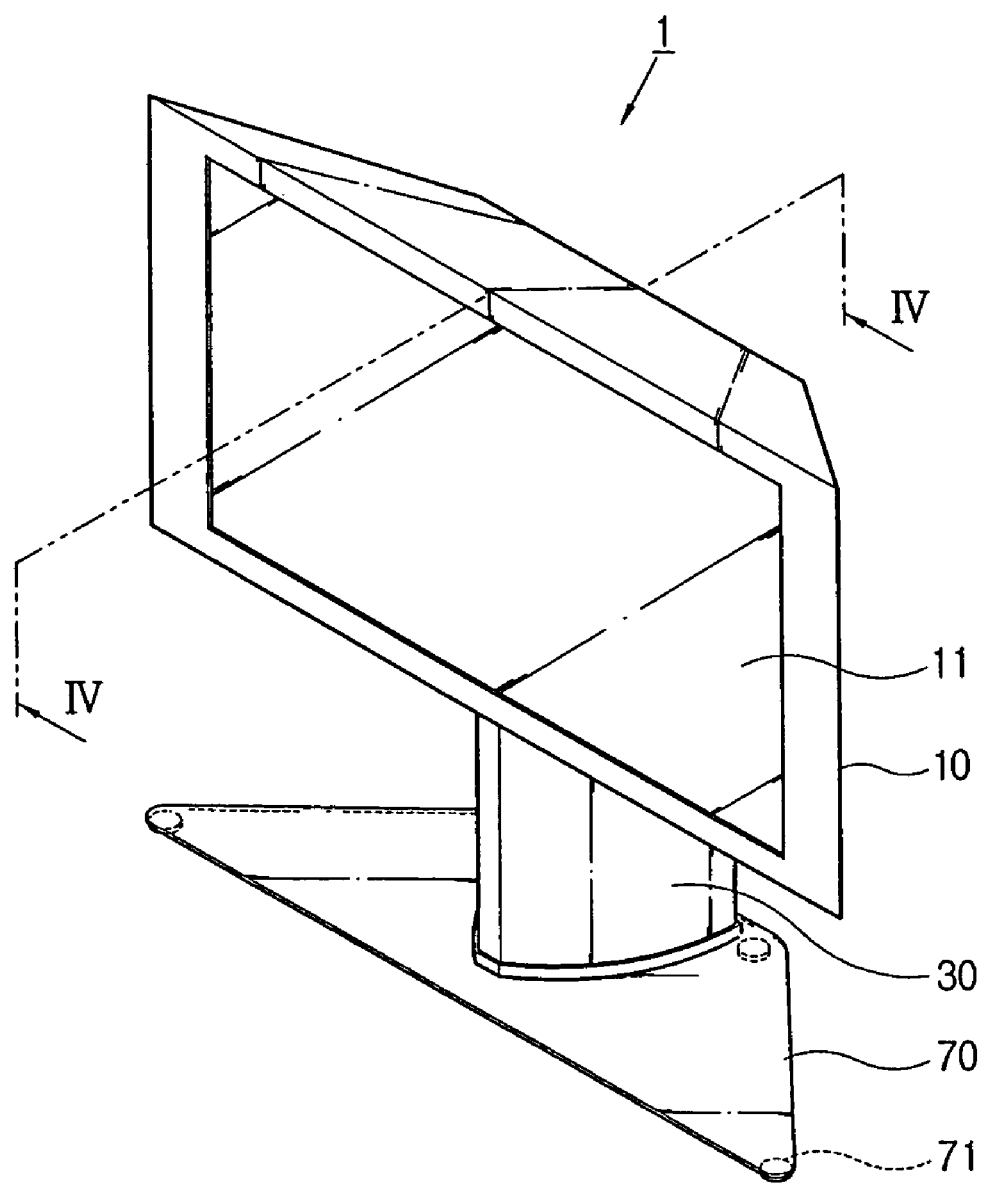
FIG. 2 is a perspective view of a projection apparatus according to an embodiment of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present invention by referring to the figures.

As shown in FIGS. 2 through 7, a projection apparatus (or projection television apparatus) 1 according to an embodiment of the present general inventive concept may include a screen 11 on which a picture is displayed, a reflector 13 (FIG. 4) placed behind the screen 11, an upper cabinet 10 to support the screen 11 and the reflector 13, an optical engine 50 (FIG. 4) provided in a lower side of the upper cabinet 10 and to project an image beam toward the reflector 13, a circuit unit 60 (FIG. 4) to drive the optical engine 50, a lower cabinet 30 to accommodate the optical engine 50 and the circuit unit 60, and a partition plate 40 (FIG. 4) provided in the lower cabinet 30 and to partition the lower cabinet 30 into upper and lower portions so as to allow the lower cabinet 30 to separately accommodate the optical engine 50 and the circuit unit 60. In an aspect of the present general inventive concept, the projection apparatus 1 may include a base 70 provided under the lower cabinet 30 and a plurality of spacers 71 provided on the base 70. The projection apparatus 1 may also include a cooling fan 43 (FIGS. 5 and 6) to cool the optical engine 50 and the circuit unit 60.

The screen can be provided in a front of the upper cabinet 10 and can display the picture based on the image beam projected from the reflector 13.

Figure 4:
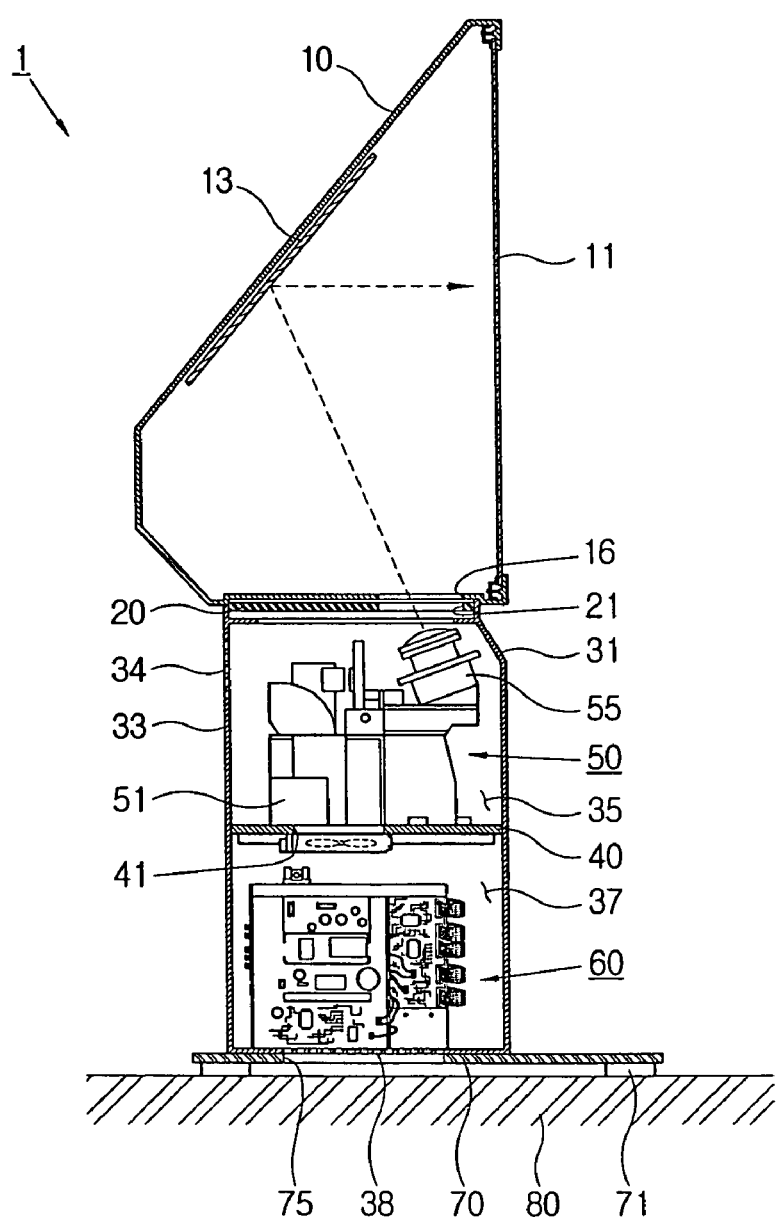
FIG. 4 is a sectional view taken along line IV—IV of FIG. 2.

The reflector 13 can be placed in a rear inside of the upper cabinet 10 and can reflect the image beam projected from the optical engine 50 toward the screen 11 as shown in FIG. 4.

Figure 3:
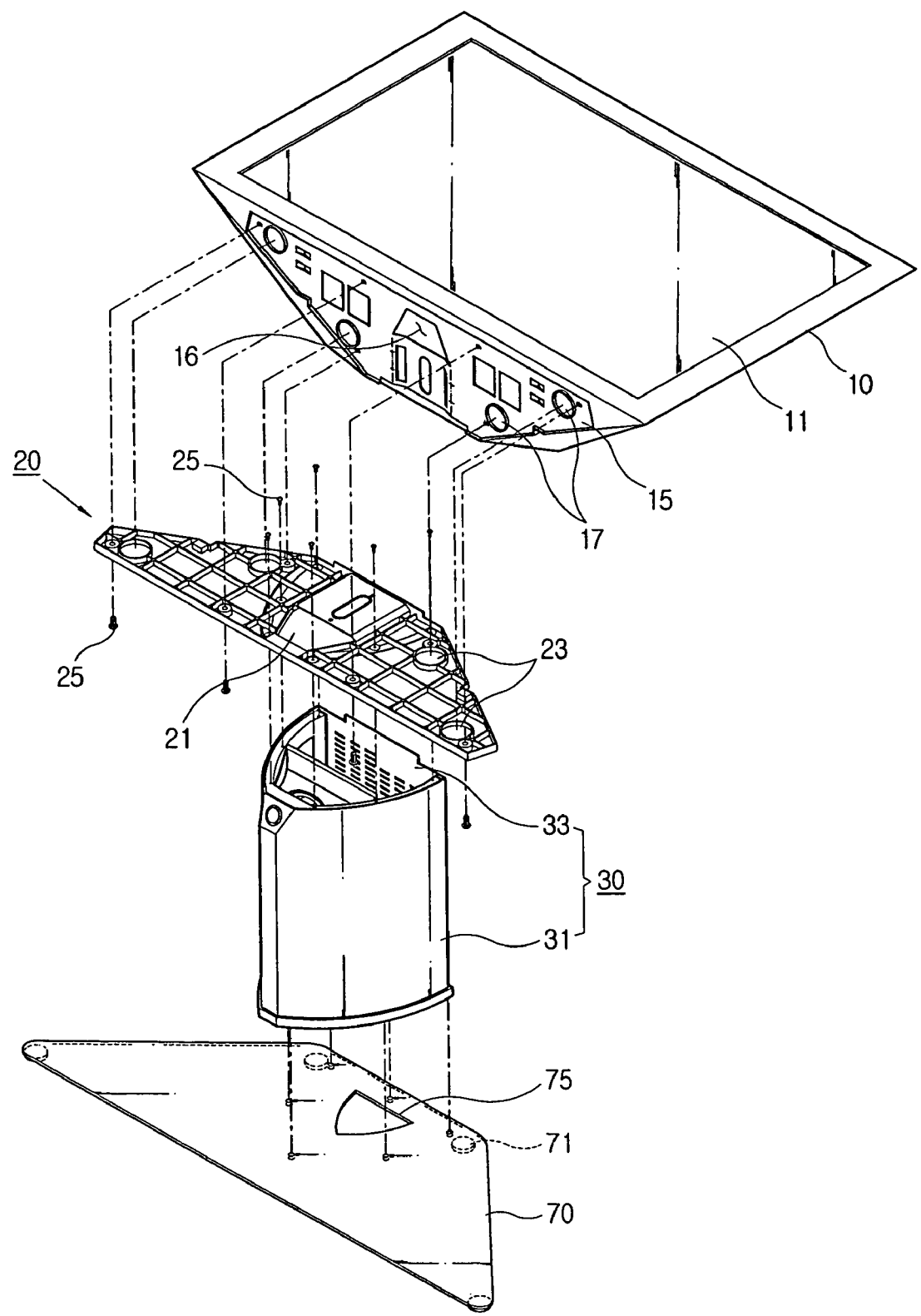
FIG. 3 is an exploded perspective view of the projection apparatus of FIG. 2.

Referring to FIG. 3, the upper cabinet 10 may have a size sufficient to support the screen 11 and the reflector 13. Further, the upper cabinet 10 can be connected to a supporting plate 20 at a bottom surface 15 thereof. Additionally, the bottom surface 15 of the upper cabinet 10 can be formed with a first beam through hole 16 through which the image beam projected from the optical engine 50 passes. In addition, the bottom surface 15 of the upper cabinet 10 can be formed with a plurality of protrusions 17 to be inserted in corresponding ones of protrusion-accommodating portions 23 of the supporting plate 20.

The supporting plate 20 may have a size corresponding to the size of the bottom surface 15 of the upper cabinet 10, thereby supporting the upper cabinet 10. Further, the supporting plate 20 can be made of an aluminous material that has solidity enough to support the upper cabinet 10. The supporting plate 20 can be made by die-casting. However, the supporting plate 20 may be made of wood, plastics, other steel materials, etc., as long as it has solidity enough to support the upper cabinet 10.

Here, the supporting plate 20 can be detachably connected to the upper cabinet 10 and the lower cabinet 30. That is, the supporting plate 20 can be coupled to the upper and lower cabinets 10 and 30 with a screw 25, so that the supporting plate 20 can be easily disassembled from the upper and lower cabinets 10 and 30. Further, the supporting plate 20 can be formed with a second beam through hole 21 through which the image beam projected from the optical engine 50 passes. Also, the supporting plate 20 can be formed with the plurality of protrusion-accommodating portions 23 to accommodate the plurality of protrusions 17 of the upper cabinet 10.

The plurality of protrusion-accommodating portions 23 can be provided to correspond to the plurality of protrusions 17 of the upper cabinet 10, so that the supporting plate 20 and the upper cabinet 10 are readily matched.

The lower cabinet 30 may have a right-and-left width narrower than that of the upper cabinet 10. The lower cabinet 30 can be detachably connected to a bottom center of the supporting plate 20. That is, the lower cabinet 30 can be coupled to the bottom center of the supporting plate 20 by a screw or the like, so that the lower cabinet 30 is readily disassembled from the supporting plate 20. Referring to FIG. 4, the lower cabinet 30 may include a front casing 31 and a rear casing 33 provided in a rear side of the front casing 31 and coupled to the front casing 31 by a screw or the like. Also, the lower cabinet 30 can be partitioned by the partition plate 40 into a lower accommodating portion 37 and an upper accommodating portion 35. The lower cabinet 30 can be formed with an air inlet 38 at a bottom surface thereof so as to inhale external air. Further, the lower cabinet 30 formed with the upper accommodating portion 35 is preferably formed with an air outlet 34 to discharge internal air.

In an aspect of the present general inventive concept, the upper accommodating portion 35 can accommodate the optical engine 50 therein. Further, the rear casing 33 disposed behind the upper accommodating portion 35 can be formed with the air outlet 34. However, the air outlet 34 may be formed on the front casing 31 or a top side of the upper accommodating portion 35.

The optical engine 50 may include a light source 51 to emit light, an illuminator (not shown) to change the light emitted from the light source into a uniform parallel light beam, a display device (not shown) to realize an image based on the light beam from the illuminator, a projecting lens 55 to project the image beam realized by the display device toward the reflector 13. Here, the optical engine 50 can generate relatively much heat in the light source 51, etc. thereof. In another aspect of the present general inventive concept, the display device of the optical engine 50 can include a digital micro mirror device (DMD), but not limited to, and may include a cathode ray tube (CRT), a liquid crystal display (LCD), and a liquid crystal on silicon (LCOS).

Figure 6:
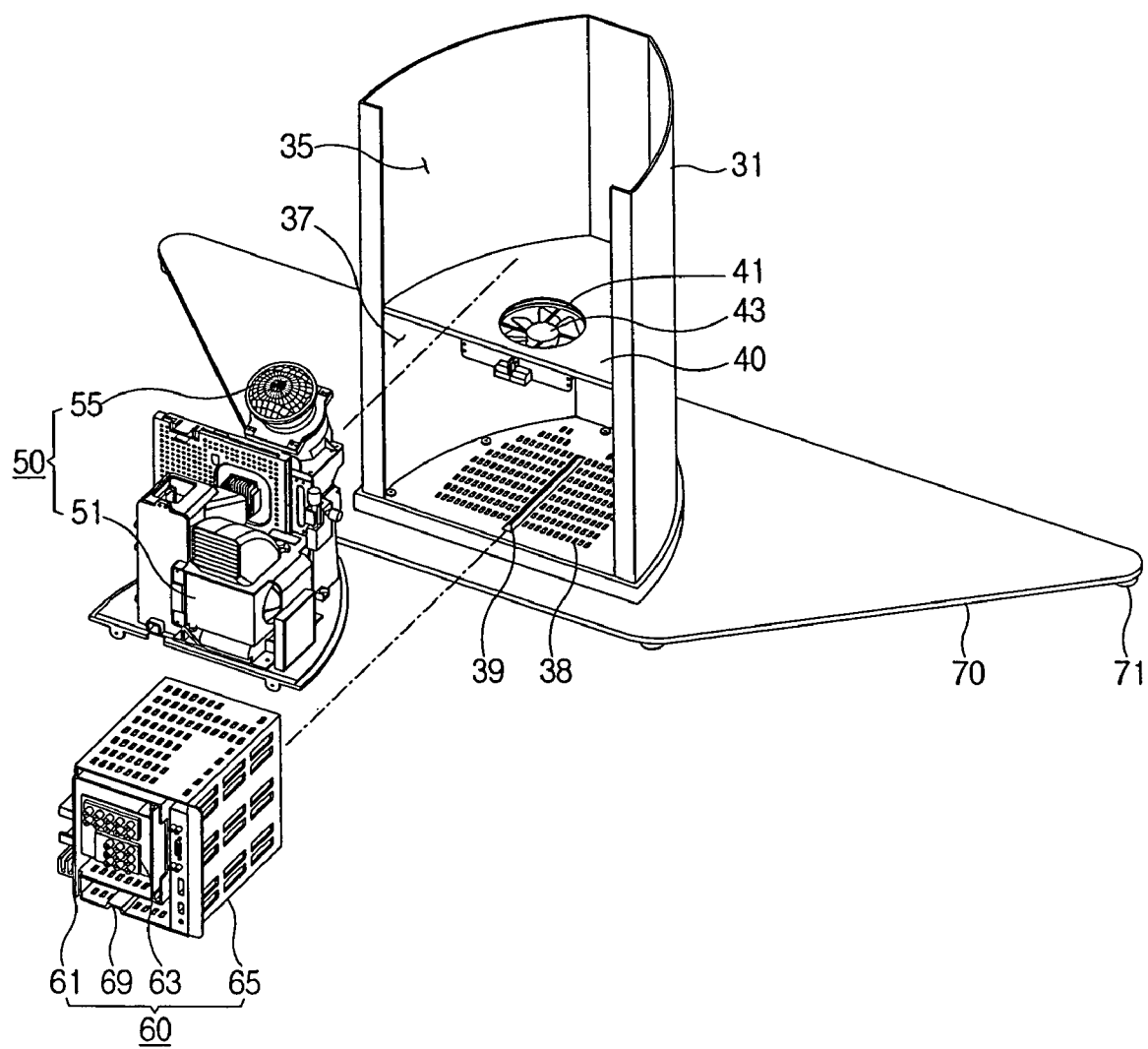
Figure 7:
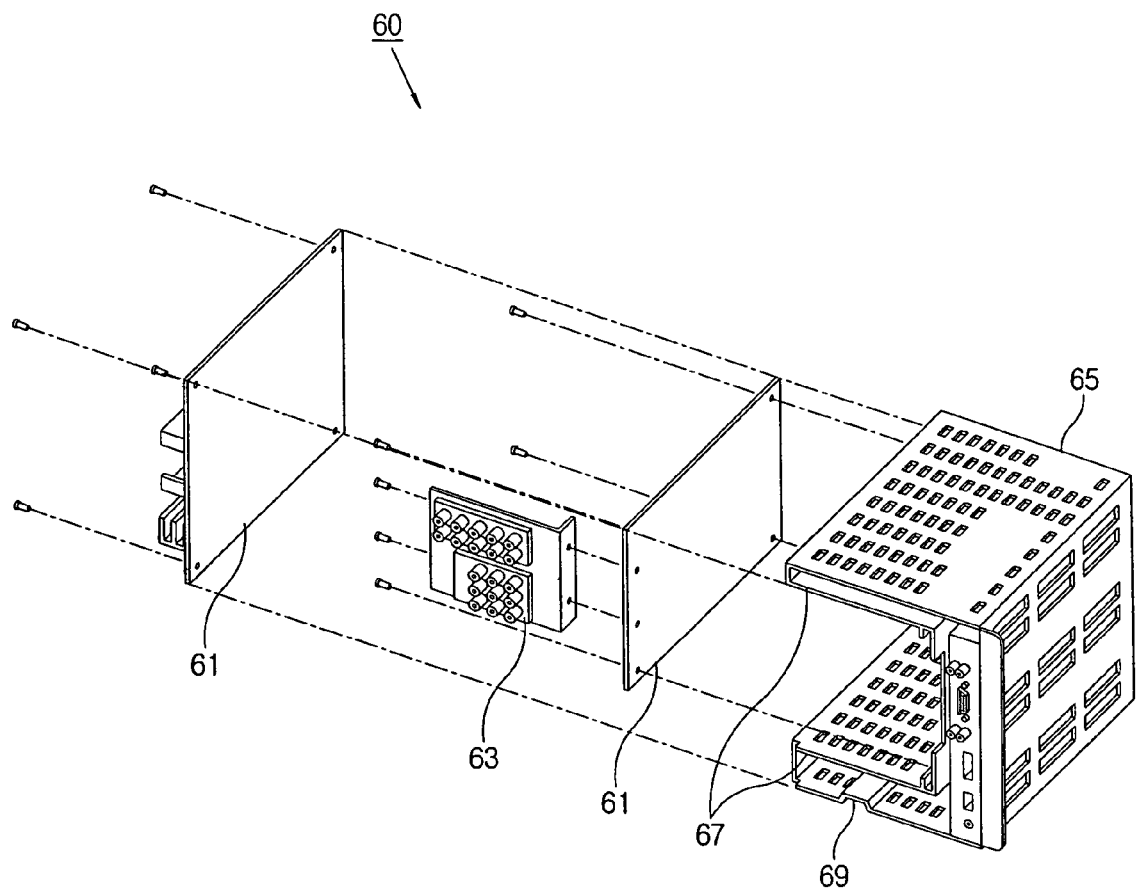
FIG. 7 is an exploded perspective view of a circuit unit of the projection apparatus of FIG. 6.

In another aspect of the present general inventive concept, the lower accommodating portion 37 can accommodate the circuit unit 60. Further, the lower accommodating portion 37 can be formed with the air inlet 38 at the bottom surface thereof. Referring to FIG. 6, the bottom surface of the lower accommodating portion 37 can be formed with a guide protrusion 39 corresponding to a guide groove 69 of the circuit unit 60 (to be described later).

Referring to FIG. 4, the base 70 can be provided between the lower cabinet 30 and a seating place 80 so as to support the upper and lower cabinets 10 and 30 on the seating place 80, and has a size larger than that of the lower cabinet 30. Further, the base 70 can be provided with the plurality of spacers 71, so that the base 70 is installed to be spaced from the seating place 80. In addition, the base 70 can be formed with a through hole 75 to communicate with the air inlet 38 of the lower accommodating portion 37. Thus, the external air between the seating place 80 and the base 70 can be inhaled into the lower accommodating portion 37 via the though hole 75 of the base 70 and the air inlet 38 of the lower accommodating portion 37.

The spacer 71 may have an upper portion mounted to the bottom surface of the base 70 and a lower portion being in contact with the seating place 80, thereby spacing the base 70 from the seating place 80. In an aspect of the present general inventive concept, the spacer 71 may have a length enough to easily inhale the external air between the seating place 80 and the base 70.

Figure 5:
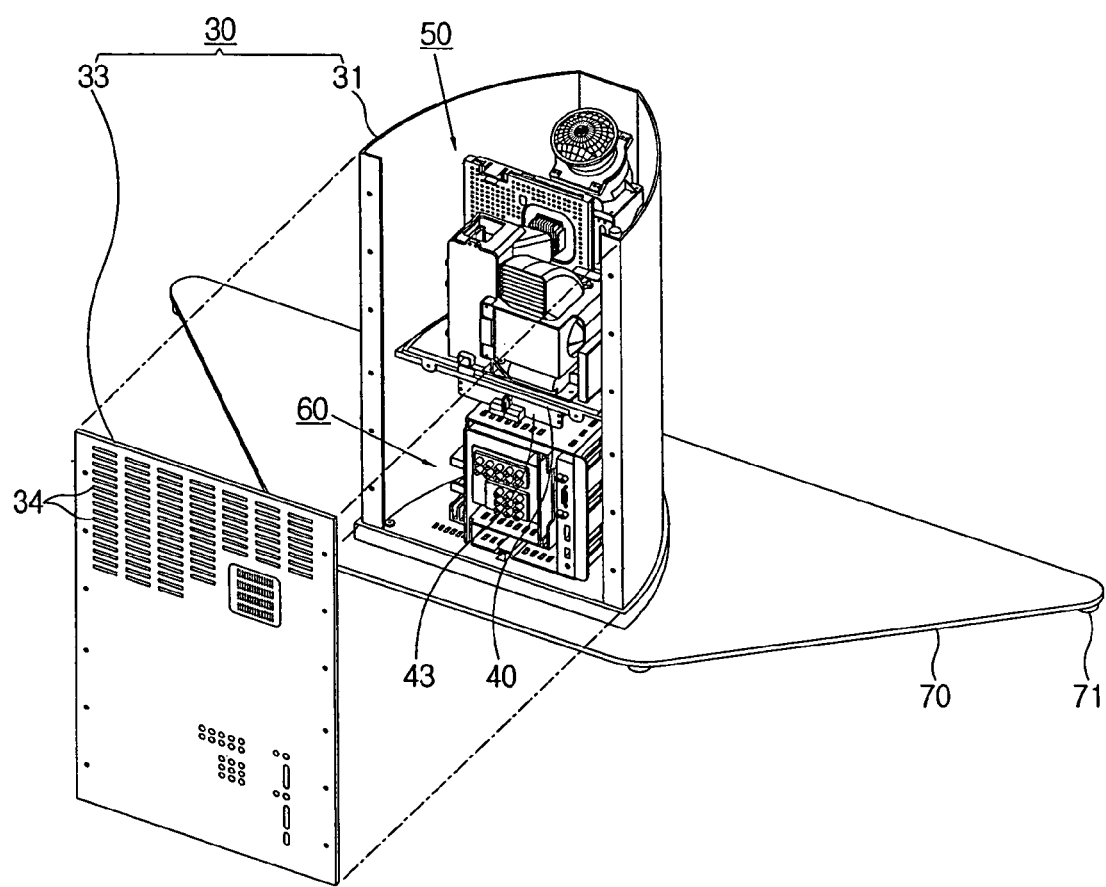
FIGS. 5 and 6 are exploded perspective views of a lower cabinet of the projection apparatus of FIG. 3.

Referring to FIGS. 5 and 6, the partition plate 40 can be provided in the lower cabinet 30 and can partition the lower cabinet 30 into the upper accommodating portion 35 and the lower accommodating portion 37. Thus, the optical engine 50 can be accommodated in either the upper accommodating portion 35 or the lower accommodating portion 37, and the circuit unit 60 can be accommodated in the other one, so that the circuit unit 60 can be isolated from the optical engine 50 that generates relatively much heat, thereby preventing the circuit unit 60 from malfunction. In this embodiment, the upper accommodating portion 35 accommodates the optical engine 50 that generates relatively much heat, and the lower accommodating portion 37 accommodates the circuit unit 60.

Further, the partition plate 40 can be formed with a ventilator 41 through which air passes between the lower and upper accommodating portions 37 and 35. That is, the air inhaled into the lower accommodating portion 37 cools the circuit unit 60 and rises in temperature, and then such air ascends toward the upper accommodating portion 35 via the ventilator 41 of the partition plate 40, thereby cooling the optical engine 50 accommodated in the upper accommodating portion 35. Thus, the air inhaled into the lower accommodating portion 37 first cools the circuit unit 60 that generates heat less than that of the optical engine 50 and ascends by convection, and then cools the optical engine 50 accommodated in the upper accommodating portion 35, thereby improving cooling efficiency.

The cooling fan 43 can be provided between the optical engine 50 and the circuit unit 60. The cooling fan 43 can be mounted to the partition plate 40 and can blow the air from the lower accommodating portion 37 toward the upper accommodating portion 35. Further, the cooling fan 43 can be disposed to correspond to the ventilator 41 of the partition plate 40 and can be coupled to a bottom surface of the partition plate 40 by a screw or the like. Hence, the air inhaled into the lower accommodating portion 37 first cools the circuit unit 60 that generates heat less than that of the optical engine 50 and ascends by forced convection due to the cooling fan 43, and then cools the optical engine 50 accommodated in the upper accommodating portion 35, thereby further improving the cooling efficiency. In this embodiment, one cooling fan 43 is provided between the optical engine 50 and the circuit unit 60, but not limited to, and a plurality of cooling fans may be provided to blow air from the lower accommodating portion 37 to the upper accommodating portion 35. Since a temperature of the heat generated from circuit unit 60 is lower than that of the heat generated from the optional engine 50, the optional engine 50 is disposed above the circuit unit 60 to generate a natural convection of heated air.

The circuit unit 60 may include a supporting frame 65 to support at least one circuit board 61. Further, the circuit unit 60 can move forward and backward to be slidably mounted in the lower accommodating portion 37 of the lower cabinet 30. That is, the supporting frame 65 of the circuit unit 60 slidably moves relative to the lower accommodating portion 37 along the base 70 or a bottom surface of the lower cabinet 30.

The supporting frame 65 can include a pair of supporters 67 to support a plurality of circuit boards 61 to stand vertically and spaced from each other in a horizontal direction. In this embodiment, the supporting frame 65 can support the pair of circuit boards 61, but not limited thereto. The supporting frame 65 may support one circuit board or three circuit boards.

The supporters 67 can support the pair of circuit boards 61 to stand being spaced from each other. Further, the supports 67 can support a terminal connector 63 provided with a plurality of ports to be connected with an input and output terminal (not shown) protruding from the rear casing 33 toward the terminal connector 63. Further, the circuit board 61 and the supporter 67 can be coupled by a screw or the like. Thus, the supporting frame 65 of the circuit unit 60 can support the circuit board 61 to stand in a vertical direction, so that the air inhaled into the lower accommodating portion 37 can ascend by the natural convection or forced convection due to the cooling fan 43, thereby effectively cooling the circuit board 61. Additionally, the supporting frame 65 of the circuit unit 60 can support the plurality of circuit boards 61 to be spaced-apart from each other in the horizontal direction, thereby improving space utilization.

To slidably connect the supporting frame 65 with the lower cabinet 30, either the supporting frame 65 or the lower cabinet 30 can be formed with the guide protrusion 39, and the other one can be formed with the guide groove 69 to accommodate the guide protrusion 39. Thus, the guide protrusion 39 and guide groove 69 can allow the circuit unit 60 to be easily inserted in and removed from the lower accommodating portion 37. Further, the circuit unit 60 can be inserted in the lower accommodating portion 37, and then coupled to the lower cabinet 30 by a screw or the like.

According to this embodiment of the present general inventive concept, the guide protrusion 39 is provided on the bottom surface of the lower accommodating portion 37 of the lower cabinet 30. The guide protrusion 39 can protrude from the bottom surface of the lower accommodating portion 37 in a forward and backward direction. However, the guide groove 69 may be formed on the bottom surface of the lower accommodating portion 37, and the guide protrusion 39 may be provided on the bottom surface of the supporting frame 65.

According to another embodiment of the present general inventive concept, the guide groove 69 can be formed on the bottom surface of the supporting frame 65 in correspondence to the guide protrusion 39 and can be lengthened along the forward and backward direction.

Figure 8:
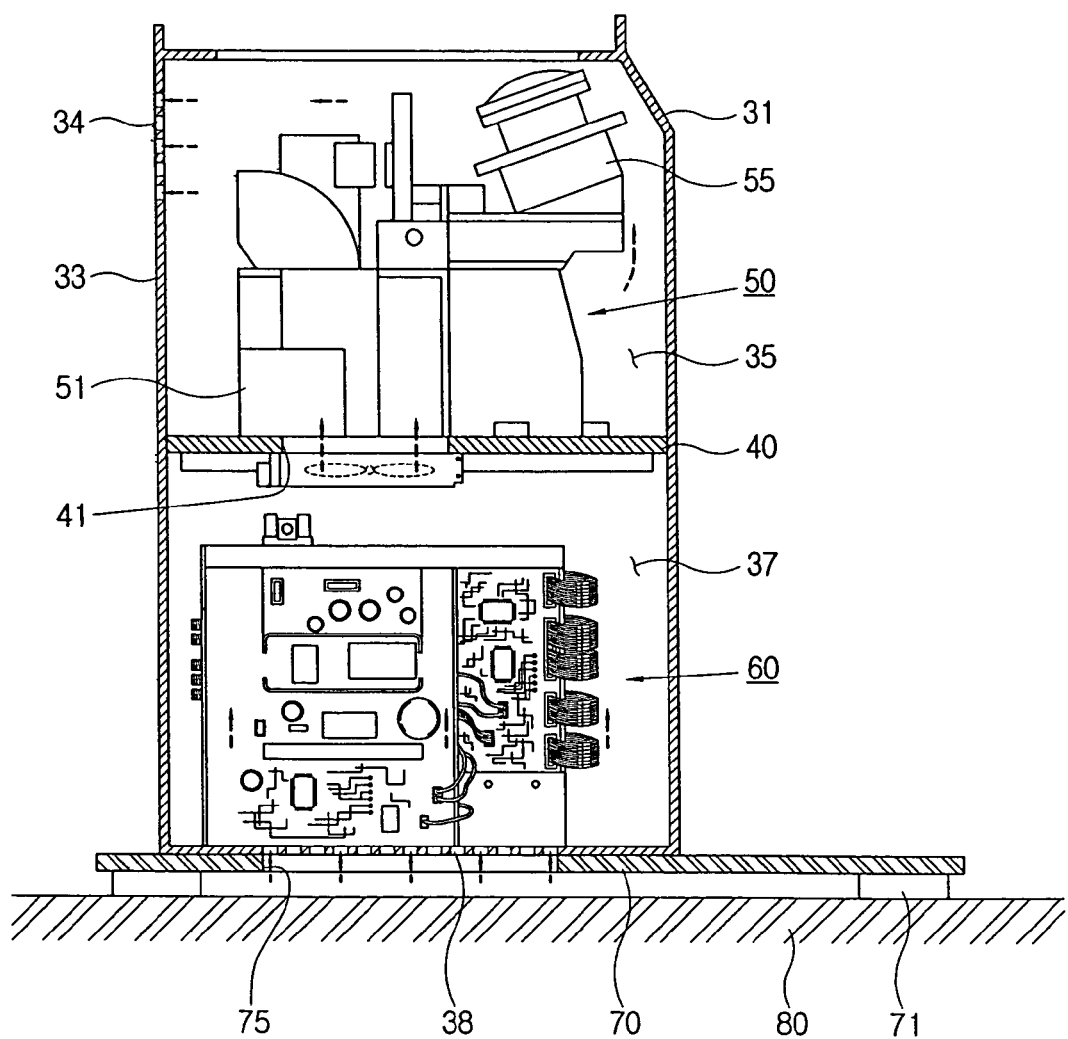
FIG. 8 is a sectional view of a cooling channel in the lower cabinet of the projection apparatus of FIG. 2 according to another embodiment of the present general inventive concept.

Hereinafter, assembling and disassembling processes and a cooling operation of the projection apparatus 1 according to another embodiment of the present general inventive concept will be described with reference to FIGS. 3 and 8.

The base 70 and the lower cabinet 30 can be coupled by a screw or the like. Then, the circuit unit 60 can be slid into and coupled with the lower accommodating portion 37 of the lower cabinet 30. Then, the optical engine 50 can be inserted in the upper accommodating portion 35 of the lower cabinet 30 and can be coupled to the lower cabinet 30 by a screw or the like. Then, the supporting plate 20 can be coupled to an upper side of the lower cabinet 30, and the upper cabinet 10 can be coupled to the supporting plate 20 by a screw or the like, thereby completely assembling the projection apparatus 1. On the other hand, the disassembling process of the projection apparatus 1 can be performed in a reverse order to the foregoing assembling process, and repetitive descriptions will be omitted.

Thus, in the projection apparatus 1, the upper cabinet 10 and the lower cabinet 30 can be readily assembled and disassembled, so that a working efficiency, such as assembling efficiency, maintenance efficiency, etc., can be improved. Particularly, even though a size of the upper cabinet 10 is increased due to the large-sized screen 11, the upper cabinet 10 and the lower cabinet 30 can be readily assembled and disassembled. Further, even though a size of the screen 11 varies, it is required to replace only the upper cabinet 10 with a corresponding one, thereby reducing a production cost. Additionally, the upper cabinet 10 and the lower cabinet 30 can be separately manufactured, so that various outer appearances can be applied to the projection apparatus 1.

The cooling operation of the projection apparatus 1 according to another embodiment of the present general inventive concept is as follows. When the projection apparatus 1 is turned on, the circuit unit 60 and the optical engine 50 can be operated to display a picture on the screen 11. At this time, the circuit unit 60 and the optical engine 50 can generate heat. Then, the external air can be inhaled into the lower accommodating portion 37 by ascending via the through hole 75 of the base 70 and the air inlet 38 formed on the bottom surface of the lower cabinet 30. Then, the air inhaled into the lower accommodating portion 37 can cool the circuit unit 60 and can ascend via the ventilator 41 of the partition plate 40 toward the upper accommodating portion 35. Then, the air flowing into the upper accommodating portion 35 can cool the optical engine 50 and can be discharged through the air outlet 34 formed on the rear casing 33 of the upper accommodating portion 35. Here, the partition plate 40 can be provided with the cooling fan 43, so that the air inhaled into the lower accommodating portion 37 via the air inlet 38 can quantitatively be increased, and the air can forcedly be blown from the lower accommodating portion 37 to the upper accommodating portion 35.

Thus, in the projection apparatus 1 according to this embodiment of the present general inventive concept, the external air flows in the lower accommodating portion 37 due to the natural convention principal, and the inflow air ascends and cools the circuit unit 60 and the optical engine 50 respectively accommodated in the lower and upper accommodating portions 37 and 35, thereby improving the cooling efficiency. Additionally, the cooling fan 43 can be provided to blow the air by the forced convection, thereby further increasing the cooling efficiency as compared with the natural convection.

As described above, the present general inventive concept may provide a projection apparatus, in which an optical engine and a driving circuit are efficiently cooled.

Further, the present general inventive concept provides a projection apparatus including an upper cabinet and a lower cabinet, so that assembling and disassembling efficiency is improved by a supporting frame provided between the upper and lower cabinets, and the projection apparatus can have various appearances.

Although a few embodiments of the present general inventive concept have been shown and described, it will be appreciated by those skilled in the art that changes may be made in these embodiments without departing from the principles and spirit of the invention, the scope of which is defined in the appended claims and their equivalents.

What is claimed is:

1. A projection apparatus, comprising:
    a screen to display a picture thereon;
    an upper cabinet to support the screen;
    an optical engine provided below the upper cabinet to project an image beam toward the screen;
    a circuit unit provided below the optical engine to drive the optical engine; and
    a lower cabinet to accommodate the optical engine and the circuit unit.

2. The projection apparatus according to claim 1, further comprising:
    a partition plate provided in the lower cabinet to partition the lower cabinet into an upper accommodating portion and a lower accommodating portion to allow the lower cabinet to separately accommodate the optical engine and the circuit unit.

3. The projection apparatus according to claim 2, wherein the partition plate comprises a ventilator to control air to pass between the lower and upper accommodating portions partitioned by the partition plate.

4. The projection apparatus according to claim 3, wherein the lower cabinet comprises an air inlet formed at a bottom surface thereof to inhale external air.

5. The projection apparatus according to claim 4, wherein the lower cabinet comprises an air outlet to discharge internal air from the upper accommodating portion.

6. The projection apparatus according to claim 3, further comprising:
    a cooling fan to cool the optical engine and the circuit unit,
    wherein the cooling fan is connected to the partition plate to control the air to blow from the lower accommodating portion to the upper accommodating portion.

7. The projection apparatus according to claim 1, further comprising:
    a supporting plate provided between the upper cabinet and the lower cabinet to support the upper cabinet.

8. The projection apparatus according to claim 7, wherein the supporting plate is made of an aluminum material and is detachably connected to the upper cabinet and the lower cabinet.

9. The projection apparatus according to claim 7, wherein the lower cabinet has a width narrower than that of the upper cabinet, and the lower cabinet is connected to a bottom center of the supporting plate.

10. The projection apparatus according to claim 1, wherein the upper cabinet has a width about 3~5 times wider than that of the lower cabinet.

11. The projection apparatus according to claim 1, wherein under the lower cabinet comprises a base having a plurality of spacers to be spaced apart from a seating place by a predetermined distance.

12. The projection apparatus according to claim 1, wherein the circuit unit comprises one or more circuit boards and a supporting frame to support the one or more circuit boards.

13. The projection apparatus according to claim 12, wherein the supporting frame comprises a plurality of supporters to support the one or more circuit boards to vertically stand and to be horizontally spaced-apart from each other.

14. The projection apparatus according to claim 13, wherein the supporting frame is slidably connected with the lower cabinet, one of the supporting frame and the lower cabinet comprises a guide protrusion, and the other one comprises a guide groove to accommodate the guide protrusion.

15. The projection apparatus according to claim 1, wherein the optical engine and the driving unit are spaced apart from each other within the lower cabinet by a predetermined distance in a vertical direction.

16. The projection apparatus according to claim 15, wherein the lower cabinet comprises:
a partition plate to separate the optical engine and the driving circuit from each other within the lower cabinet by the predetermined distance in the vertical direction.

17. The projection apparatus according to claim 15, wherein the lower cabinet is partitioned into an upper sub-cabinet and a lower sub-cabinet by a partition plate, one of the optical engine and the driving circuit is disposed in the upper sub-cabinet above the partition plate, and the other of the optical engine and the driving circuit is disposed in the lower sub-cabinet below the partition plate.

18. A projection apparatus having a base, comprising:
a first cabinet having a screen to display a picture thereon; and
a second cabinet disposed between the first cabinet and the base, having an optical engine disposed on a first plane spaced-apart from the base by a first height to generate an image beam corresponding to the picture, and having a circuit unit disposed on a second plane spaced-apart from the base by a second height different from the first height to control the optical engine.

19. The projection apparatus according to claim 18, wherein the second cabinet comprises an upper accommodating portion and a lower accommodating portion to accommodate the optical engine and the circuit unit, respectively.

20. The projection apparatus according to claim 18, wherein the optical engine generates a first heat having a first temperature, and the circuit unit generates a second heat having a second temperature lower than the first temperature, so that air around the circuit unit ascends to the optical engine by natural convection.

21. The projection apparatus according to claim 18, wherein the first height is higher than the second height from the base.

22. The projection apparatus according to claim 18, wherein the first plane is higher than the circuit unit.

23. The projection apparatus according to claim 18, wherein the first plane is parallel to the second plane.

24. The projection apparatus according to claim 18, wherein the first plane and second plane are disposed in a direction from the first cabinet to the base through the second cabinet.

25. The projection apparatus according to claim 18, wherein the first plane does not pass through the circuit unit.

26. The projection apparatus according to claim 18, wherein the second plane is disposed on the base.

27. The projection apparatus according to claim 18, further comprising:
a cooing fan disposed between the first plane and the second plane to control air disposed around the circuit unit to flow toward the optical engine.

28. The projection apparatus according to claim 18, further comprising:
a cooling fan disposed parallel to at least one of the first plane and the second plane to forcibly blow air from the circuit unit to the optical engine.

29. The projection apparatus according to claim 18, wherein the optical engine comprises a light source to emit light to correspond to the image beam, and the light source is disposed on the first plane higher than the circuit unit.

30. The projection apparatus according to claim 29, wherein the optical engine comprises a projecting lens to project the image beam, and the projecting lens is disposed to be closer to the first cabinet than the light source.

31. The projection apparatus according to claim 18, further comprising;
a supporting plate disposed between the first cabinet and the second cabinet and having a hole through which the image beam passes from the second cabinet to the first cabinet.

32. The projection apparatus according to claim 31, wherein the supporting plate is disposed parallel to at least one of the first plane and the second plane.

33. The projection apparatus according to claim 18, further comprising:
a partition plate disposed in the second cabinet to separate the optical engine from the circuit unit,
wherein the first plane and the second plane are disposed opposite to each other with respect to the partition plate.

34. The projection apparatus according to claim 33, wherein the partition plate is disposed parallel to at least one of the first plane and the second plane.

35. The projection apparatus according to claim 33, wherein the partition plate is disposed on a plane which does not pass through the optical engine and the circuit unit.

36. The projection apparatus according to claim 33, wherein the partition plate divides an inside of the second cabinet into an upper accommodating portion and a lower accommodating portion to accommodate the optical engine and the circuit unit, respectively.

37. The projection apparatus according to claim 36, wherein the first plane is disposed in the upper accommodating portion and the second plane is disposed in the lower accommodating portion.

38. The projection apparatus according to claim 33, wherein the partition plate comprises a hole through which air around the circuit unit flows toward the optical engine.

39. The projection apparatus according to claim 33, wherein the air is heated to a first temperature by the circuit unit, is moved to the optical engine through the hole of the partition plate, and is heated to a second temperature by the optical engine.

40. The projection apparatus according to claim 18, wherein the circuit unit comprises a plurality of circuit boards disposed perpendicular to at least one of the first plane and the second plane.

41. The projection apparatus according to claim 40, wherein the circuit boards are paraliel to each other.

42. The projection apparatus according to claim 18, wherein the circuit unit comprises a supporting frame having a guide groove, and the base comprises a guide protrusion to be slidably inserted into the guide groove when the circuit unit is slidably inserted into the second cabinet in a direction parallel to the first plane and the second plane.

43. The projection apparatus according to claim 18, wherein the circuit unit comprises a supporting frame slidably inserted into the second cabinet and a circuit board fixedly coupled to the supporting frame and disposed perpendicular to one of the first plane and the second plane.

44. The projection apparatus according to claim 18, wherein the base comprises an air inlet, the second cabinet comprises an air outlet, and air blows in a direction from the air inlet to the air outlet through the circuit unit and the optical engine.

45. The projection apparatus according to claim 18, wherein the base forms a bottom of the second cabinet, and the second cabinet comprises an air inlet formed on the base and an air outlet formed on a position spaced-apart from the base by a third height higher than the first plane.

46. The projection apparatus according to claim 18, further comprising:
an air inlet formed on a position of the second cabinet lower than the second plane; and
an air outlet formed on a position of the second cabinet higher that the first plane.

47. The projection apparatus according to claim 18, further comprising:
a supporting plate connected to a bottom of the first cabinet, and having a portion connected to the second cabinet,
wherein the supporting plate has a first area in a direction parallel to one of the first plane and the second plane, and the second cabinet has a second area smaller than the first area in the direction.

48. The projection apparatus according to claim 47, wherein the base has a third area in the direction, and the second area is smaller that the first area and the third area.

49. The projection apparatus according to claim 47, wherein the portion of the supporting plate has the same area as the second area of the second cabinet.

50. The projection apparatus according to claim 47, wherein the bottom of the first cabinet has the same area as the first area of the supporting plate, and the first area is larger than the portion corresponding to the second cabinet.

51. The projection apparatus according to claim 47, wherein the bottom of the first cabinet comprises a first beam through hole, the supporting plate comprises a second beam through hole, and the image beam emitted from the optical engine passes through the first and second beam through holes to form the picture on the screen.

52. The projection apparatus according to claim 18, wherein the second cabinet comprises a first casing disposed between the base and the first cabinet to be perpendicular to one of the first plane and the second plane, and a second casing disposed perpendicular to the one of the first plane and the second plane to be coupled to the first casing to provide an inside space to accommodate the optical engine and the circuit unit.

53. The projection apparatus according to claim 52, wherein the first casing has a round side in a direction parallel to one of the first plane and the second plane, and the second casing covers an open side of the round side of the first casing.

54. A projection apparatus having a base, comprising:
a first cabinet having a screen to display a picture thereon;
a second cabinet disposed between the first cabinet and the base, having an optical engine disposed on a first plane-spaced-apart from the base by a first height to generate an image beam corresponding to the picture, and having a circuit unit disposed on a second plane spaced-apart from the base by a second height different from the first height to control the optical engine;
a supporting plate disposed between the first cabinet and the second cabinet, and having a hole through which the image beam passes from the second cabinet to the first cabinet; and
a partition plate disposed between the first plane and the second plane, and having a hole through which air blows from the circuit unit to the optical engine.

* * * * *